FREQUENCY DIVERSITY TELEGRAPH SYSTEM

Filed Nov. 19, 1947 6 Sheets-Sheet 1

*INVENTORS*
J. E. BOUGHTWOOD
BY A. E. MICHON

ATTORNEY

FREQUENCY DIVERSITY TELEGRAPH SYSTEM

INVENTORS.
J. E. BOUGHTWOOD
A. E. MICHON

BY

ATTORNEY

Feb. 21, 1950 J. E. BOUGHTWOOD ET AL 2,497,859

FREQUENCY DIVERSITY TELEGRAPH SYSTEM

Filed Nov. 19, 1947 6 Sheets-Sheet 3

INVENTORS
J. E. BOUGHTWOOD
A. E. MICHON

BY

[signature]
ATTORNEY

Feb. 21, 1950  J. E. BOUGHTWOOD ET AL  2,497,859

FREQUENCY DIVERSITY TELEGRAPH SYSTEM

Filed Nov. 19, 1947  6 Sheets-Sheet 4

INVENTORS
J. E. BOUGHTWOOD
A. E. MICHON

BY

ATTORNEY

Feb. 21, 1950 J. E. BOUGHTWOOD ET AL 2,497,859

FREQUENCY DIVERSITY TELEGRAPH SYSTEM

Filed Nov. 19, 1947 6 Sheets-Sheet 5

INVENTORS
J. E. BOUGHTWOOD
A. E. MICHON

BY R. F. Presson
ATTORNEY

INVENTORS
J. E. BOUGHTWOOD
A. E. MICHON
BY
ATTORNEY

Patented Feb. 21, 1950 2,497,859

UNITED STATES PATENT OFFICE 2,497,859

FREQUENCY DIVERSITY TELEGRAPH SYSTEM

John E. Boughtwood, Brooklyn, N. Y., and Alfred E. Michon, Summit, N. J., assignors to The Western Union Telegraph Company, New York, N. Y., a corporation of New York Application November 19, 1947, Serial No. 786,910

11 Claims. (Cl. 250—8)

This invention relates to a frequency diversity telegraph system which is capable of providing continuous and positive operation at high speeds under serious fading and interference conditions, and more particularly to such a system which employs frequency modulation and frequency diversity methods to obviate fading and interference effects in the received signals.

It is characteristic of the fading phenomena on radio circuits that the fading may be sharply selective as to frequency. For example, one or several narrow frequency ranges within a voice frequency band may be suppressed at times by fading or interference while the larger portion of the band is unaffected. When a voice frequency band is utilized to provide a plurality of telegraph circuits through the superposition of voice frequency carrier telegraph channels, it has been observed that transmission on one or more of the telegraph channels may be interrupted by selective fading while other channels may be only slightly impaired or unaffected.

In order to overcome random interference when a multichannel carrier telegraph system is operated over a radio circuit, it has heretofore been proposed to devote separate and complete channel frequencies for the marking and spacing signal pulses. Thus, if the available voice band would normally accommodate twelve telegraph channels, only six message channels would be available in such a system. As an additional measure to combat selective fading it has also been proposed to connect in parallel two or more such channels spaced, for example, 1000 cycles apart, for the marking pulses, and two or more such channels in parallel for the spacing pulses, to achieve a form of diversity operation. Under these conditions, when the parallel pairs of channels are employed only three message channels are realized and the message capacity of each is only that of the initial carrier channel which occupies one-twelfth of the available voice band. If, as sometimes happens, the fading and interference effects in such a system can not be obviated by the use of parallel pairs of subchannels, a group of three or four subchannels in parallel is required for the marking pulses and a similar number required for the spacing pulses of each channel, thus greatly reducing still further the message channels available in a given voice band.

The disadvantages of such a wasteful procedure will readily be appreciated; in many such cases it has been questioned whether the disadvantages of diversity methods of this type compensate for the advantages obtained in regard to reduction of fading and interference effects.

In accordance with the present invention it is possible to operate satisfactorily as many as ten high speed frequency modulated carrier telegraph channels over a single voice band of 3000 cycles and to connect spaced pairs of subchannels in parallel to provide diversity reception, whereby the subchannels of each pair may be spaced suitable distances apart, for example, 1500 cycles, and yet allow a total of five high speed telegraph channels within the 3000 cycle voice band and having the advantages of diversity reception. The invention relates to a system in which the marking and spacing signals are produced by frequency modulation, or frequency shift, methods whereby the marking and spacing signals of each subchannel are transmitted and received respectively through common band pass filters, as distinguished from two-tone systems in which the marking and spacing signals require two independent amplitude modulated carrier telegraph channels respectively.

Among the objects of the invention are to provide an improved radio telegraph system employing frequency diversity transmission and reception of a character which insures continuous and positive operation at high speeds under selective fading and interference conditions; to reduce the wastage of frequency space in a frequency diversity telegraph system and enable a much larger number of useful channels, for example, twice as many such channels, to be employed in a given band within the frequency spectrum; to effect substantial economies in the filter and oscillator equipment required; to provide a frequency diversity system particularly suitable for multichannel operation and which also is adapted for multiplex telegraph operation; to enable different combinations of subchannel frequencies readily to be utilized in order to meet specific fading and interference conditions on particular radio circuits; to provide more suitable means whereby the subchannel receiving the strongest signal will disable temporarily the associated subchannel whose signal strength has faded below a predetermined operative level; and to insure suitable level and phase equalization on the subchannels employed in a frequency diversity system of the character described.

Other objects and advantages will be apparent from the following detailed description of several illustrative embodiments of the invention, taken in connection with the accompanying drawings in which.

Figure 1:
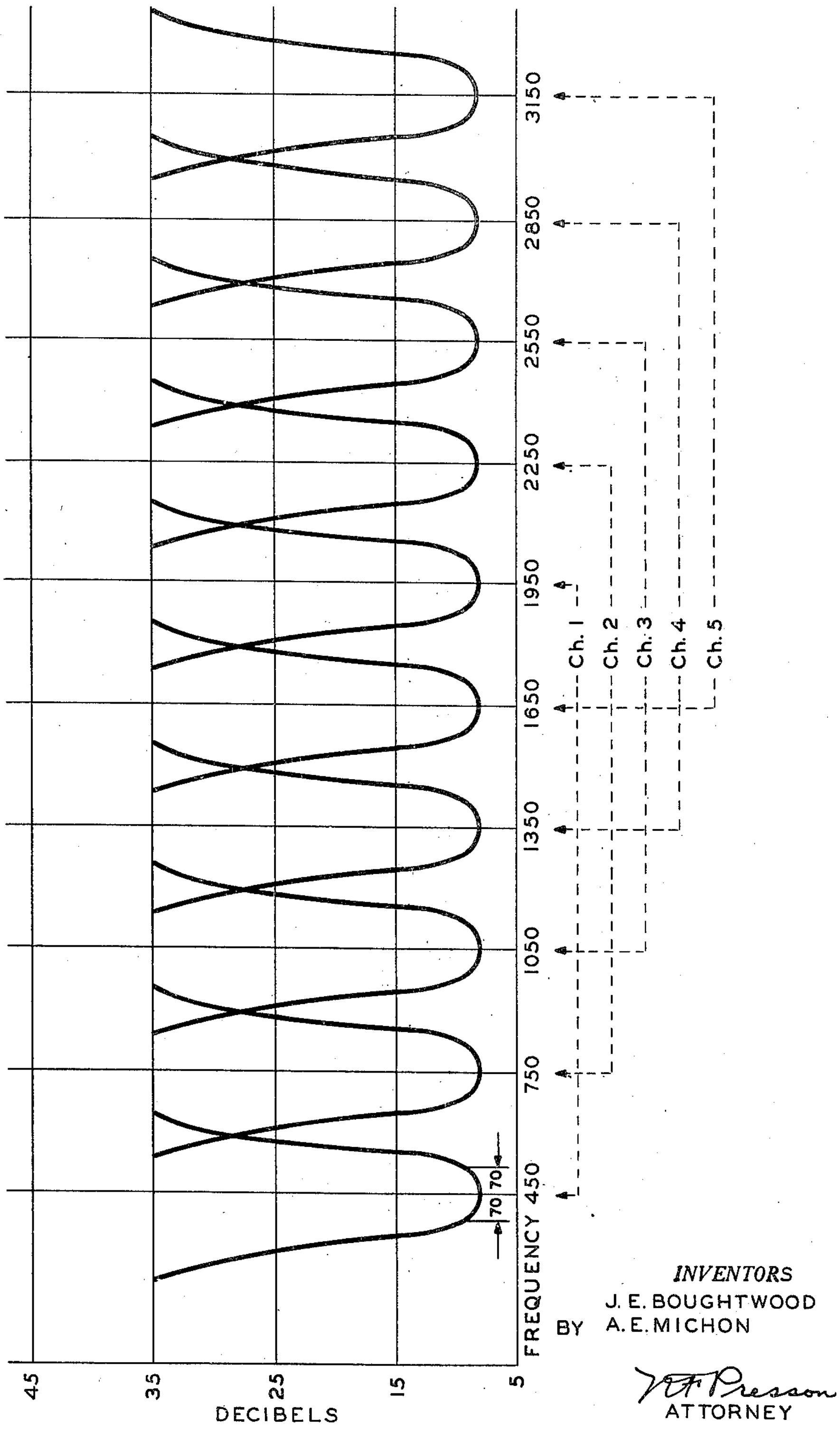
Fig. 1 shows diagrammatically one set of channel combinations in accordance with the invention in which each message channel comprises a pair of subchannels spaced 1500 cycles apart, together with the subchannel filter arrangement employed.

Referring to Fig. 1, there is illustrated a set of channel combinations which may be used when the subchannels are spaced 1500 cycles apart, to allow a total of five high speed telegraph channels within a voice band of 3000 cycles and embodying the advantages of diversity reception for each of the channels. The subchannels are of the frequency modulated type, such as described in the patent to J. E. Boughtwood, No. 2,291,369, issued July 28, 1942; these subchannels, when spaced at 300 cycle intervals, are suitable for multiplex telegraph circuits operating at speeds of 120 bauds or higher. The five channels within the 3000 cycle voice frequency band indicated, i. e., from 300 cycles to 3300 cycles, are all suitable for the high operating speed mentioned. Channel 1, it will be seen, embodies subchannels at frequencies of 450 cycles and 1950 cycles, respectively; and channels 2 to 5 likewise are comprised of pairs of interspersed subchannels spaced 1500 cycles apart.

Figure 2:
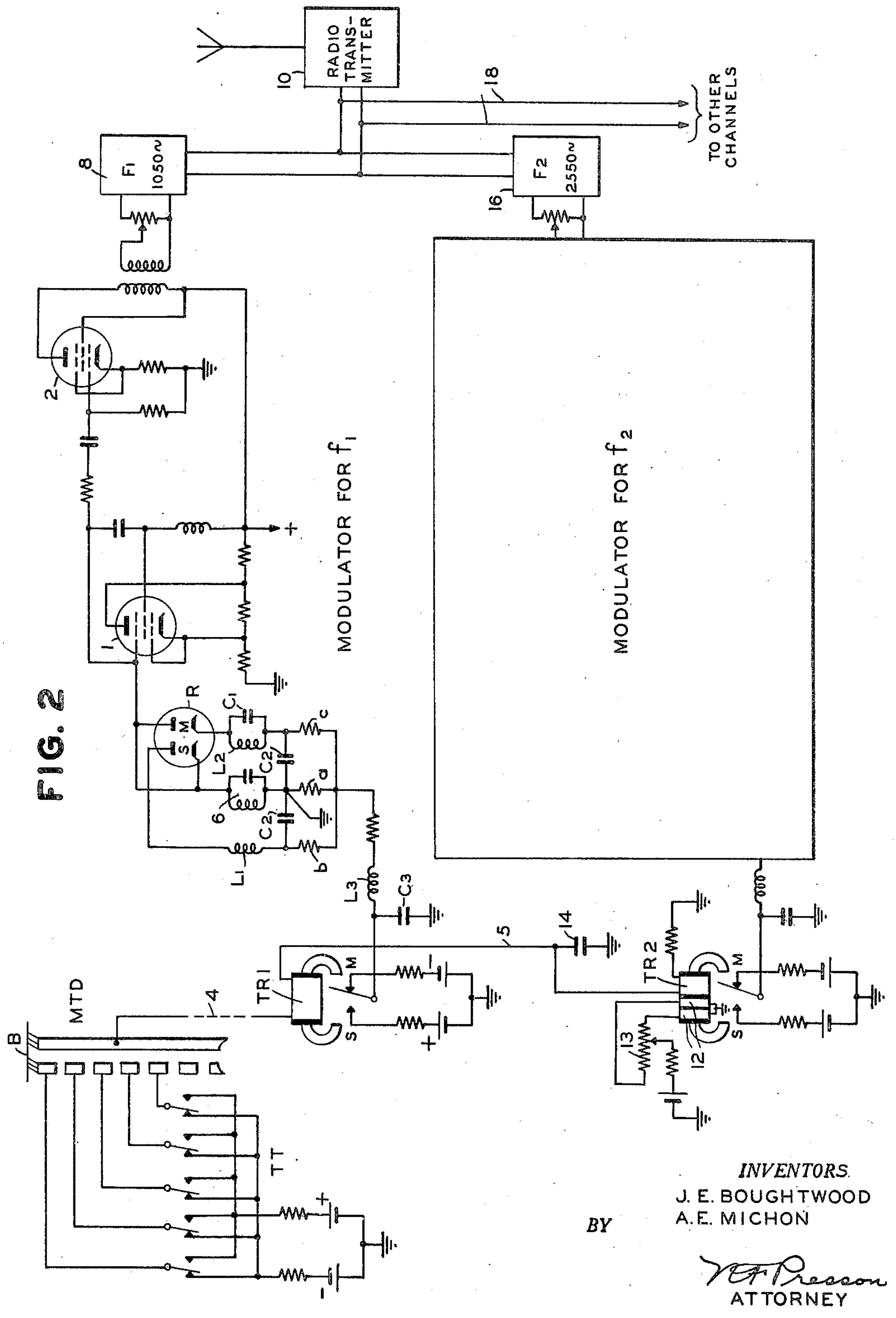
Fig. 2 illustrates the transmitting end of a multiplex radio telegraph system arranged to accommodate a number of frequency-modulated channels operating in frequency diversity relation in accordance with the instant invention.

Fig. 2 illustrates the transmitting end of a radio telegraph system arranged to accommodate a number of multiplex channels operating in frequency diversity relation, with the circuits of one of these channels outlined in detail. Two subchannel frequency-modulated transmitters are shown in the figure, which transmitters preferably are of the type disclosed in Fig. 6 of the aforesaid Boughtwood patent; the two transmitters are identical except that the subchannel frequencies differ; the center frequencies of the two subchannels illustrated are 1050 and 2550 cycles, respectively, to give a spacing of 1500 cycles, and together form channel 3 depicted in Fig. 1. At the upper left-hand portion of the figure is diagrammatically shown an automatic transmitter, such as a tape transmitter TT, the five transmitting contact tongues of which are connected to five segments of a multiplex transmitting distributor MTD, thus forming a multiplex transmitting channel. As the five-contact tongues of the tape transmitter are selectively set in accordance with the code perforations representing a character in a perforated tape, positive and negative potentials are applied to the associated segments of the transmitting distributor, and as the brush B of the distributor rotates the polar marking and spacing pulses comprising the permutation code characters of the message are transmitted successively by the distributor MTD over a conductor 4 to the operate winding of a polar transmitting relay TR1 and thence over a conductor 5 to the operate winding of another polar transmitting relay TR2, to ground, the relays thus being connected in series. Relay TR1 is associated with a modulator circuit for a frequency $f1$, for example, 1050 cycles, comprising one subchannel, and relay TR2 is associated with a similar modulator circuit for the frequency $f2$, for example, 2550 cycles, comprising the other subchannel of the pair. A condenser 14 is connected effectively in shunt to the transmitting relay TR2 which modulates the higher subchannel frequency in order that, as hereinafter referred to, the signals received over the lower frequency subchannel will not lag behind those received over the higher frequency subchannel due to the greater delay in the channel filters for the lower frequency. If desired, oppositely wound biasing windings 12 may be embodied in relay TR2 to compensate for bias present in the signals as received by the relay, the correction of which may be effected by adjustment of the potentiometer 13.

Each of the modulators comprises an oscillator 1 which in the illustrative embodiment comprises a pentode vacuum tube, although it is to be understood other types of oscillators capable of rapid frequency change will serve equally well. The oscillator is adjusted by means of an anti-resonant circuit 6 to generate a carrier frequency located at the center of the assigned subchannel band. To produce the marking and spacing signals, the frequency of the oscillator is varied by like amounts, for example, 70 cycles, upward and downward from the center frequency by alternately connecting in parallel with the tuned circuit 6, auxiliary reactance elements L1 and C1. This switching operation is accomplished by means of a twin diode rectifier tube R having rectifier electrode sections S and M under control of the telegraph signals. As explained in the Boughtwood patent, the inductance L1 is chosen with respect to the inductance of the circuit 6, so that the inductance of the two in parallel causes an increase in the natural period of the oscillating system equal to the desired frequency deviation. Likewise, the condenser C1 and the inductance L2 in combination are similarly chosen with respect to the condenser of circuit 6 to produce a like decrease in frequency. The inductance L2 furnishes a direct current by-pass around the condenser C1 while large condensers C2 provide a carrier frequency by-pass to ground.

The function of the elements *a*, *b*, *c*, L3 and C3 is to alter the received direct current telegraph signal to the shape which has been found particularly desirable in the production of frequency modulated carrier telegraph signals and to control the conductivity of the marking and spacing rectifier sections M and S alternately in accordance with the shape of these telegraph signals. The square top telegraph reversals received from the transmittting relay TR1 or TR2 are given a smoothly rounded form by the inductance L3 and the condenser C3 in combination and flow thence to ground through the resistance *a*. The potential developed across this resistance is applied equally to the rectifier sections S and M through the rather high value resistances *b* and *c*, respectively. If a spacing or positive signal is being received, the resistance of the rectifier section S is reduced from infinity down to substantially zero to gradually introduce inductance in parallel with the tuned circuit 6 up to the full value of the inductance coil L1 at a rate determined by the smoothly rounded form of the telegraph signals. The generated carrier frequency will then have shifted upward in exact accordance with this change in tuning by an amount equal to the predetermined deviation frequency, viz., 70 cycles. Similarly, the application of a marking signal will cause the gradual introduction of the effective capacity of the C1L2 combination in parallel with the tuned circuit up to the full value of the combination to cause a like downward shifting of the generated carrier frequency. The signal potential which renders one rectifier section conductive to introduce the desired reactance element, at the same time renders the other rectifier section non-conductive at the same time-rate to remove the other reactance element. This simultaneous introduction and withdrawal of the mutually opposing reactance elements in parallel with the circuit 6 causes relatively slow and smooth transition of the oscillator frequency between the marking and spacing values as determined by the shape of the modulating signals. The functions of resistance *b* and *c* is to prevent short-circuiting of the resistance *a* through the rectifier section which is at the instant conducting and thus reducing to zero the opposing potential which maintains the other rectifier section in the non-conducting condition. The rectifier sections S and M are energized by the exciting telegraph potential which exceeds the maximum alternating current potential compressed upon the rectifier sections so that their operating impedance to the carrier current is constant. As a consequence the constants of the oscillating circuits are entirely independent of variations in the exciting potentials received from the transmitting relay.

The oscillator is coupled by any suitable form of coupling to one or more amplifier stages 2 as needed for applying the modulated carrier current telegraph signals to the transmitting filter 8 or 16 from whence the signals are applied to common channel busses 18 and thence to a radio transmitter 10 for transmission to a distant radio receiver. The type of radio transmitter or receiver used or the character of transmission is not an essential requirement for the successful operation of the present system. For example, either amplitude modulation or frequency modulation may be used between the radio transmitter and a receiver. At the receiving end a single antenna will suffice under some conditions, but the usual advantages will accrue from the utilization of space diversity antennae.

Figure 3:
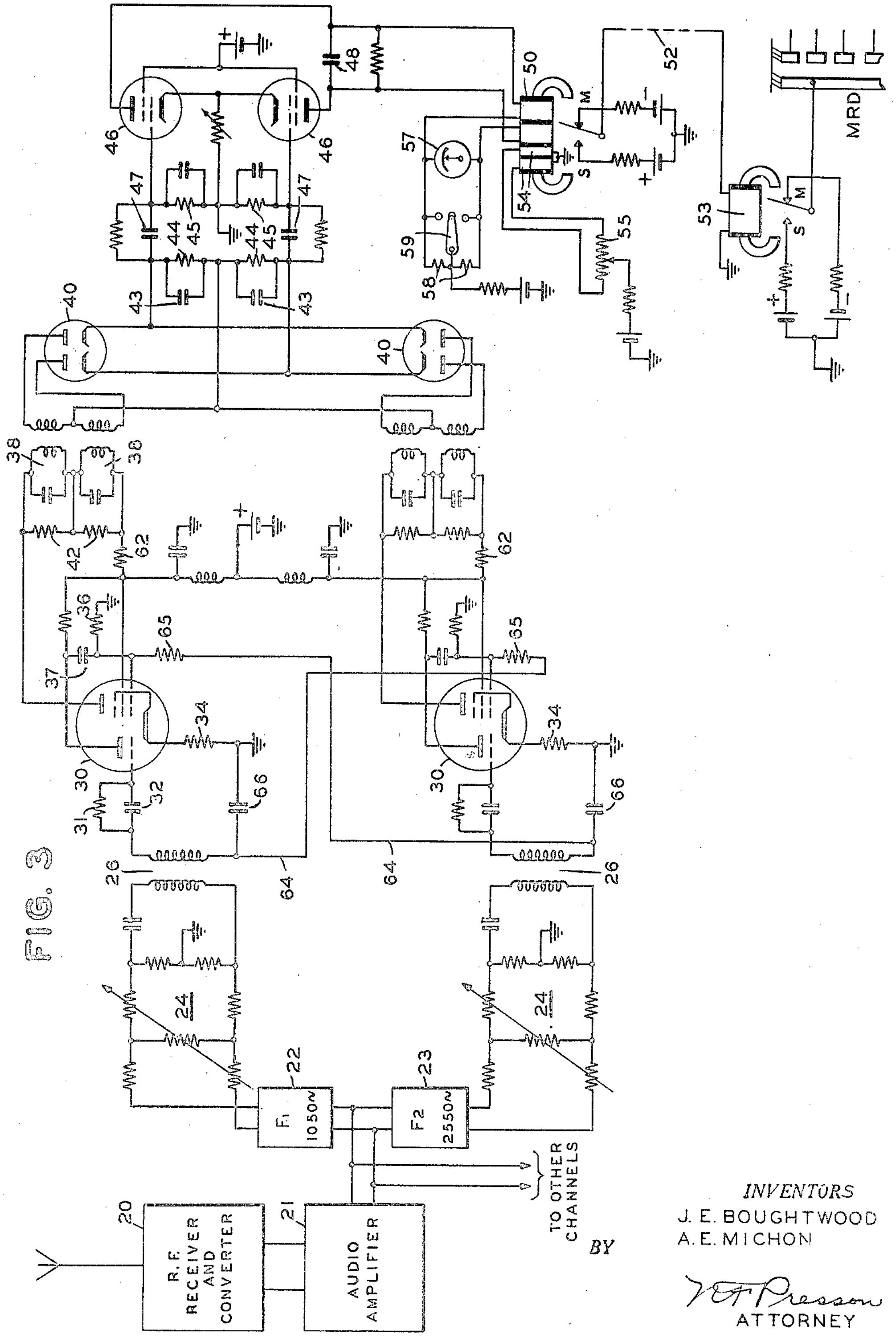
Fig. 3 shows a circuit for frequency diversity reception utilizing two subchannels and embodying the features of the invention.

Fig. 3 illustrates a circuit suitable for receiving the frequency modulated signals transmitted by the system of Fig. 2. Upon reception the marking and spacing signals are converted to audio frequencies by the radio frequency receiver and converter 20, and the audio frequency signals are then amplified in the audio amplifier 21. The converter 20 and amplifier 21 may comprise any of the known types suitable for the purpose. Channel frequency filters 22 and 23 in pairs select the subchannels which in combination form each channel. Each channel receiver includes duplicate sections for each subchannel for the functions of amplifying, limiting and detecting, and at the output of the detector-rectifiers the duplicate signals, now converted to amplitude modulated direct currents, are fed into a common direct current amplifier which operates a receiving relay, the contacts of which relay retransmit the signals into the receiving leg of a terminal multiplex set. The method of receiving frequency modulated signals on each subchannel is generally in accordance with the method disclosed in the aforesaid Boughtwood patent, although the receiving circuit of Fig. 3 includes changes and additional elements to provide for frequency diversity reception in accordance with the instant invention.

Following each of the subchannel filters 22 and 23 is an adjustable level control circuit 24 for matching up the levels of the received carriers in the two sections of the receiver. From the level control circuit the marking and spacing signals of each subchannel are applied through a transformer 26 to a limiting amplifier 30 which preferably comprises a two-stage resistance coupled thermionic amplifier employing for the first stage a triode and for the second stage a pentode. As illustrated, a type of tube in which both the stages are included within a single glass or metal envelope has been found to operate very satisfactorily and with economy in consumption of space and power, although separate tubes for the respective stages obviously may be employed. In the first stage of tube 30 there is included in series with its grid a resistance 31 of comparatively high value shunted by a small condenser 32. With such a resistance of suitable value the amplifying action of the tube remains approximately linear up to a certain limiting value of input voltage, but above this value the positive half-waves of the input signal will cause a space current to flow in the grid-cathode circuit to produce an IR drop across the resistance 31 in such direction as to make the grid more negative, thus reducing the amplication of the tube. As in the input level increases the grid potential is progressively depressed in a negative direction until a balance is reached between the energizing input potential and the paralyzing bias potential. At this point, which is governed by the value of the resistance 31, the output level tends to become constant.

The two stages of the tube constitute a unitary limiter and high gain amplifier which provides a constant output working level of adequate value for operating the discriminating and other detecting devices while receiving extremely low input levels. Very high gain is secured by means of regeneration between the output and input stages so that even very low input levels may be amplified above the level where limiting action occurs. This regeneration is accomplished by means of a resistance 34 which is common to the cathode and the grid elements of both stages of the two. The current from the cathode of the second stage flows through this resistance to produce a potential drop across the resistance which is in phase with and augments the input voltage to the first stage. By this regenerative action the gain of the amplifier as a whole is tremendously increased over the mere aggregate gain of the two stages taken separately, and therefore it is possible to extend the lower operating limits of the amplifier to exceedingly low levels while maintaining a constant output at a relatively high level. The signal input voltage though small is augmented by the feedback voltage to quickly reach a point where limiting action takes place, and since the output is constant the feedback remains constant. A substantially stable position now obtains, the feedback furnishing the greater part of the energizing potential while the signaling potential remains just large enough to maintain control and prevent oscillation. In case the action of the first stage of the tube should be insufficient to give a perfectly constant output level, a supplemental limiting action may be obtained by proper choice of the values of a resistance 36 and condenser 37 in the grid circuit of the second stage of the tube.

The cathode current of each stage applied through the resistance 34 impresses a degenerative potential upon its own grid; these degenerative effects, however, are so much smaller than the regenerative effects produced by the cathode current of the second stage upon the grid of the first stage that they are entirely overcome. The amount of regeneration secured is dependent upon the value of the resistance 34; this resistance should be large enough to provide a large degree of feedback, approximately 90% of the voltage on the grid of the first stage, but the feedback should not be so large that any tendency towards oscillation would not be effectively suppressed with the signal at the lowest received level to be expected.

After amplification in tube 30, the frequency modulated telegraph signals are applied to a translating circuit comprising two anti-resonant circuits 38 and a twin diode rectifier 40 which discriminates between the marking and spacing frequencies. The two resonant circuits 38 are separately tuned, one to the marking frequency and one to the spacing frequency, their outputs being applied separately to the two sections of the rectifier 40. Resistances 42 provide damping for the tuned circuits thereby to prevent amplitude distortion effects which tend to accompany sharp tuning. The circuits 38 are designed so as to have low impedance to the harmonics of the carrier frequencies which are normally present as a consequence of the limiting action of the preceding amplifier, so that these harmonics are effectively by-passed. After rectification the marking and spacing signals of each subchannel flow separately through their associated resistances 44, the potential across which is applied differentially to the grids of the push-pull amplifier circuit comprising tubes 46. The resistances 44 perform the function of removing the large direct current components of the demodulated signal voltages which occur as a consequence of the improved separating action of the discriminator circuits 38. Since these circuits are rather broadly tuned and the marking and spacing carrier frequencies are spaced relatively close to each other, the momentarily received current is not confined to the appropriate rectifier section but an appreciable portion flows also through the negative rectifier portion and in effect opposes the useful signal current in each subchannel. This spurious current is continuously present in both of the resistances 44 but flows in opposite directions so that no potentials from this cause appear across the outer terminals of the resistances to be impressed upon the amplifier 46. The amplifier voltage is applied differentially to a receiving relay 50 which has oppositely wound operate windings. The condensers 43 serve to by-pass the alternating current component of the rectified carrier in each subchannel while the condenser shunted resistances 45 serve to establish the potentials of the grids of the amplifier tubes 46 with respect to ground.

The two resistance shunted condenser combinations 47 are employed to correct the small amount of characteristic distortion which commonly occurs in carrier telegraph channels of restricted band width. The effect of these devices may be supplemented, if desired, by the similar combination 48 shown in shunt to the relay 50.

The receiving relay 50 retransmits the received signals into a receiving leg 52 and thence to a polar relay 53 which marks the transmitting ring of a multiplex receiving distributor MRD that applies the received signals to the proper channel receiving apparatus which may be a telegraph printer, tape reperforator or other suitable device. The two differentially wound operate windings of relay 50 preferably are connected in circuit with a resistance 58 and a milliammeter 57. A switch 59 is connected to the electrical midpoint of the resistance 58, and when the switch is in its open position, as viewed in the figure, the milliammeter 57 should give a midpoint zero reading if the receiving amplifier circuit is symmetrical, and by moving the switch upwardly and downwardly a relative indication of the currents flowing in the respective plate circuits of the tubes 46 is obtained. The arrangement also provides a means of checking any circuit bias when test signals are being transmitted. The relay 50 has two oppositely wound biasing windings 54, and a potentiometer 55 is connected in circuit with the biasing windings to provide a final adjustment to take care of any dissymmetry in the final portion of the receiving circuit and to remove bias from the final signal. After lining up the two subchannels individually as regards oscillating frequencies, deviation, discriminator frequencies, sent and received levels, biasing, etc., it is desirable to make final adjustments to insure that the two signals on the respective subchannels, in the absence of fading are identical and coincident when applied to the common amplifying portion of the receiver.

Resistors 62 of suitable value are employed for equalizing levels. An additional correction is necessary in order to equalize the phase of the two direct current signals, which follows from the fact that signals received over the lower frequency subchannel tend to lag behind those received over the higher frequency subchannel because of the different time delays respectively in the subchannel filters. To eliminate this difference in arrival time at the common portion of the receiver the faster signal is delayed an appropriate amount. This may be accomplished in various ways, but one convenient method, as hereinbefore stated, is to shunt the transmitting relay TR2, Fig. 2, of the higher frequency subchannel by a condenser 14 of suitable value.

Satisfactory operation of the system is not limited to the illustrative amplifier and limiter shown in Fig. 3, although this limiting amplifier has been found very effective in such circuits. Since the amplifier is regenerative on weak signals, should the received signal fade to zero in one of the subchannels that amplifier will tend to generate sustained oscillations. To prevent this occurrence the grid circuits of the first stages of the amplifiers 30 are cross-connected by conductors 64 and resistances 65 to the grid circuits of the second stages of the other amplifiers, respectively. Hence, while each amplifier is free to amplify regeneratively on weak signals, should the signal on one subchannel disappear due to selective fading a negative biasing potential fed from the active subchannel reduces the sensitivity of the amplifier on the weaker channel and prevents oscillation. Resistance 65 and condenser 66 comprise a low pass filter, or smoothing circuit, to prevent the frequency of one subchannel from being introduced into the limiter of another subchannel. Noise may continue to be received in a subchannel when signals are absent, but the reduced sensitivity of the amplifier limits its discriminator output voltage to a value substantially below that of the active channel. Furthermore, this residual noise voltage is prevented from reaching the common direct current amplifier 46 inasmuch as the detector output voltage of the active subchannel is also impressed across the output of the detector of the inactive subchannel, so as to render it non-conductive. This condition persists until the discriminator output voltages are substantially equal. The noise rejecting properties of these frequency modulated subchannels contribute very substantially to satisfactory operation through severe interference.

The frequency choices and separation are not limited to those indicated and may be changed wherever advantage offers. For example, a consistency in the interference or fading pattern may favor a particular choice of subchannel frequencies. If one polarity of both subchannels fades consistently the situation may be improved by reversing the order of the frequencies used for marking and for spacing on one of the subchannels; this may be accomplished in any convenient manner, as by means of reversing switches on the contacts of the transmitting relays and on the receiving discriminators.

The adaptation of the disclosed type of frequency modulated carrier telegraph channels to a radio system utilizing frequency diversity has resulted in extraordinary continuity of operations through conditions of severe noise and fading. At the same time a very high message capacity for the radio system is achieved because of the high channel speeds available; for example, over a single radio telephone circuit five telegraph channels may be operated each accommodating a four-channel sixty-word multiplex, to give a total message capacity of 1200 words per minute. While a particular type of FM detector or discriminator has been illustrated in Fig. 3, other known types of detectors may be employed in the receiving circuit, it being necessary only that their outputs supplement each other in their control of the receiving relay 50.

The system described herein is particularly applicable to single side band radio circuits. On such systems interchannel cross talk is substantially negligible and all of the subchannels may be fully utilized. On double side band systems, as is well known, selective fading of the carrier causes the production in large magnitudes of even harmonics of the modulation frequencies, and as will be noted from Fig. 1 it is not possible to utilize all of the bands as subchannels if no even harmonics are to be permitted to fall within another band, so that the efficiency of utilization of the radio spectrum is therefore somewhat reduced in the double sideband case.

Figure 4:
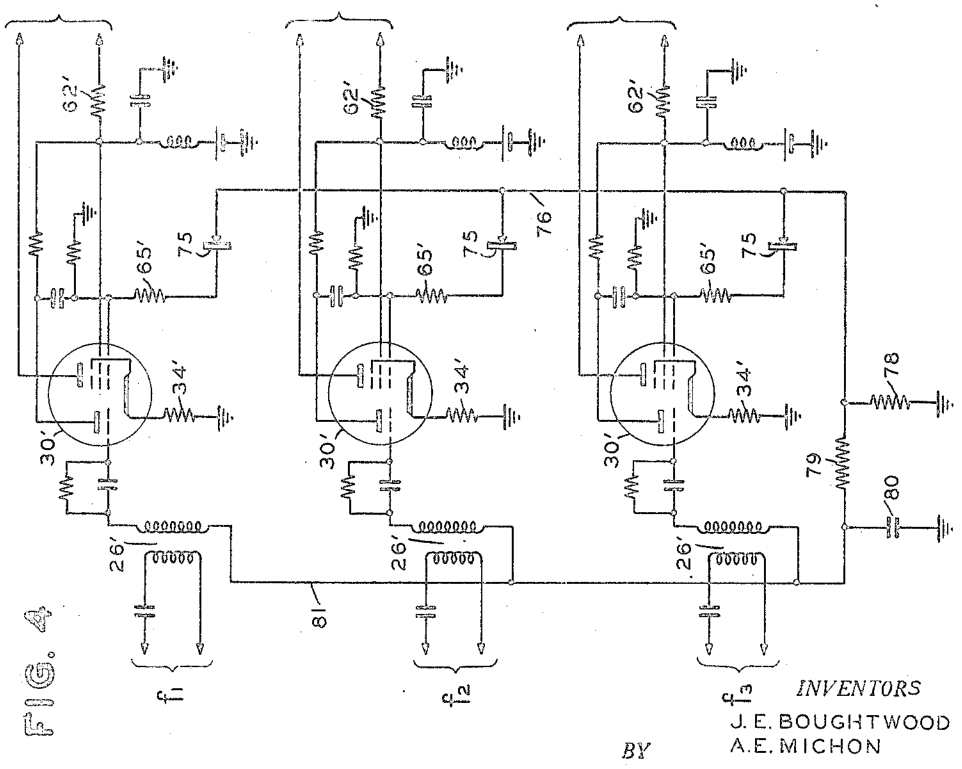
Fig. 4 shows a circuit for frequency diversity reception involving three subchannels.

The preceding detailed description of frequency diversity subchannels has referred particularly to the case where pairs of subchannels are spaced within a band of voice range width. The system, however, is capable of wider application; the overall band may be of greater width to afford greater separation for the subchannels and more than two subchannels in parallel may be employed. Figure 4 illustrates how three subchannel receivers operating on three specified frequencies may be joined to operate into a common output circuit. Each of the three basic subchannel receivers is similar to those illustrated in Fig. 3, the detector-rectifier outputs being joined to a common direct current amplifier and receiving relay as shown in Fig. 3. Elements in Fig. 4 corresponding to those in Fig. 3 are identified by the same reference numerals with a prime mark added.

For the purpose of preventing the generation of spurious oscillations in a limiting amplifier when its subchannel frequency fades to a level too low to exercise control, and to prevent the noise output of the discriminator from entering the common direct current output amplifier, the limiting amplifiers may be cross-connected as follows: The input grid of the second stage of each subchannel amplifier 30′ is connected, through a rectifier 75 and conductor 76 to a common resistance 78, and the rectifiers 75 are so poled that negative potentials existing on any of the grids of the amplifiers are transmitted to the resistance 78. The cumulative potential across this resistance is then applied to the grids of the first stages of the amplifiers in parallel by means of a smoothing circuit of relatively short time constant comprising resistance 79 and condenser 80, the circuit being completed by a conductor 81 to the grids of the first stages of the amplifiers 30′. With this circuit, so long as all subchannels receive an input level sufficient to produce normal output after limiting, the subchannels will all contribute like superimposed potentials to the common direct current amplifier. However, when one received channel frequency has a level substantially greater than the other two the negative potential across resistance 78 is determined by the stronger channel only. This follows because this negative potential is also impressed across the rectifiers of the weaker channels and renders them nonconducting, so that they do not contribute to the voltage impressed across resistance 78. This potential is sufficient to materially reduce the limited output of the weaker channels so that they do not contribute to the signal in the output amplifier and also are prevented from self-oscillation. At the transmitting end the transmitting relays of the three subchannels may be connected to operate in any desired manner. For example, the operate windings of the three relays may be connected in series in the order of their frequencies, in conjunction with shunting condensers, such as the condenser 14 of Fig. 2, adjusted to provide coincident signals at the output of the receiving discriminators.

Figure 5:
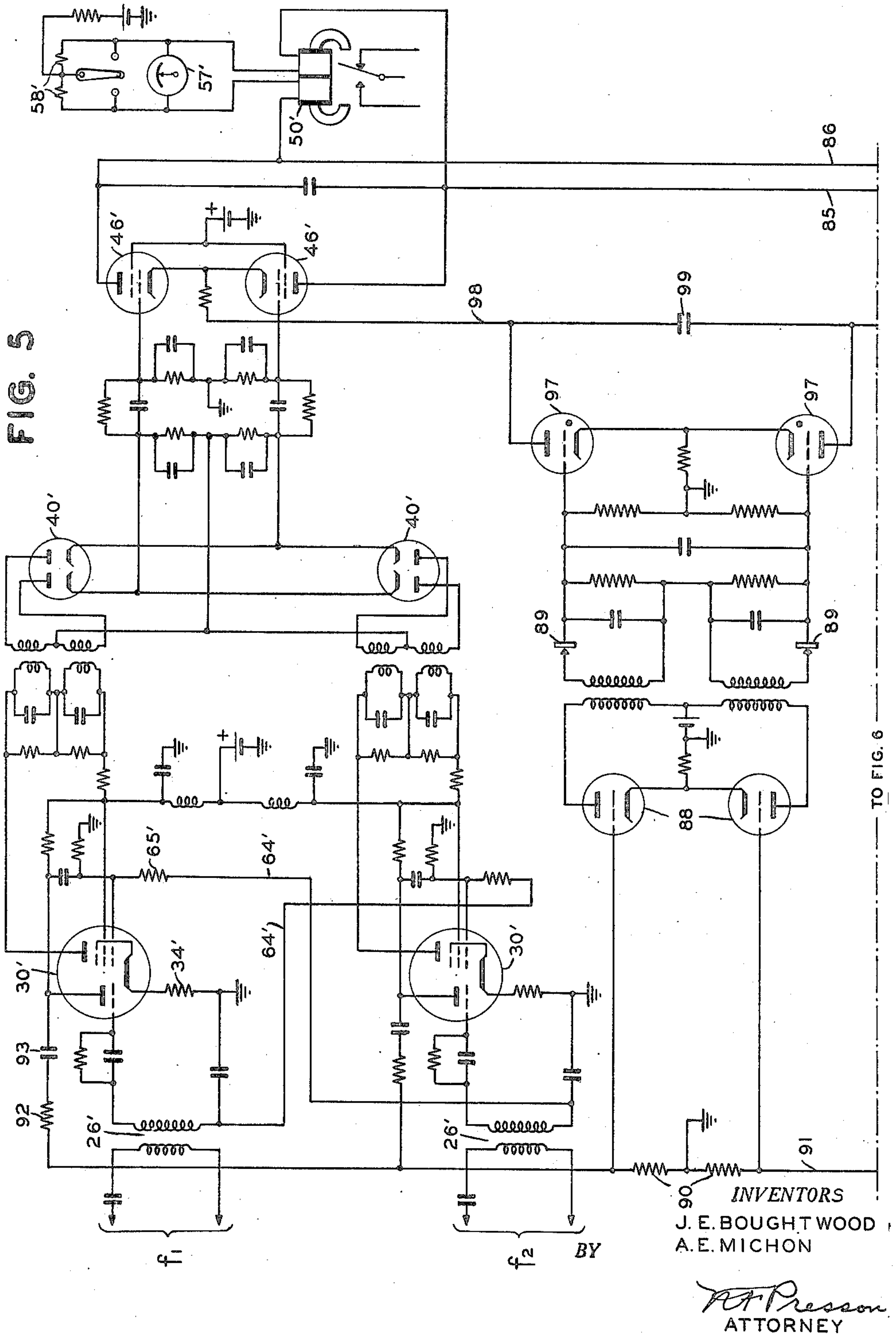
Figs. 5 and 6 illustrate a receiving circuit for frequency diversity with four subchannels.
Figure 6:
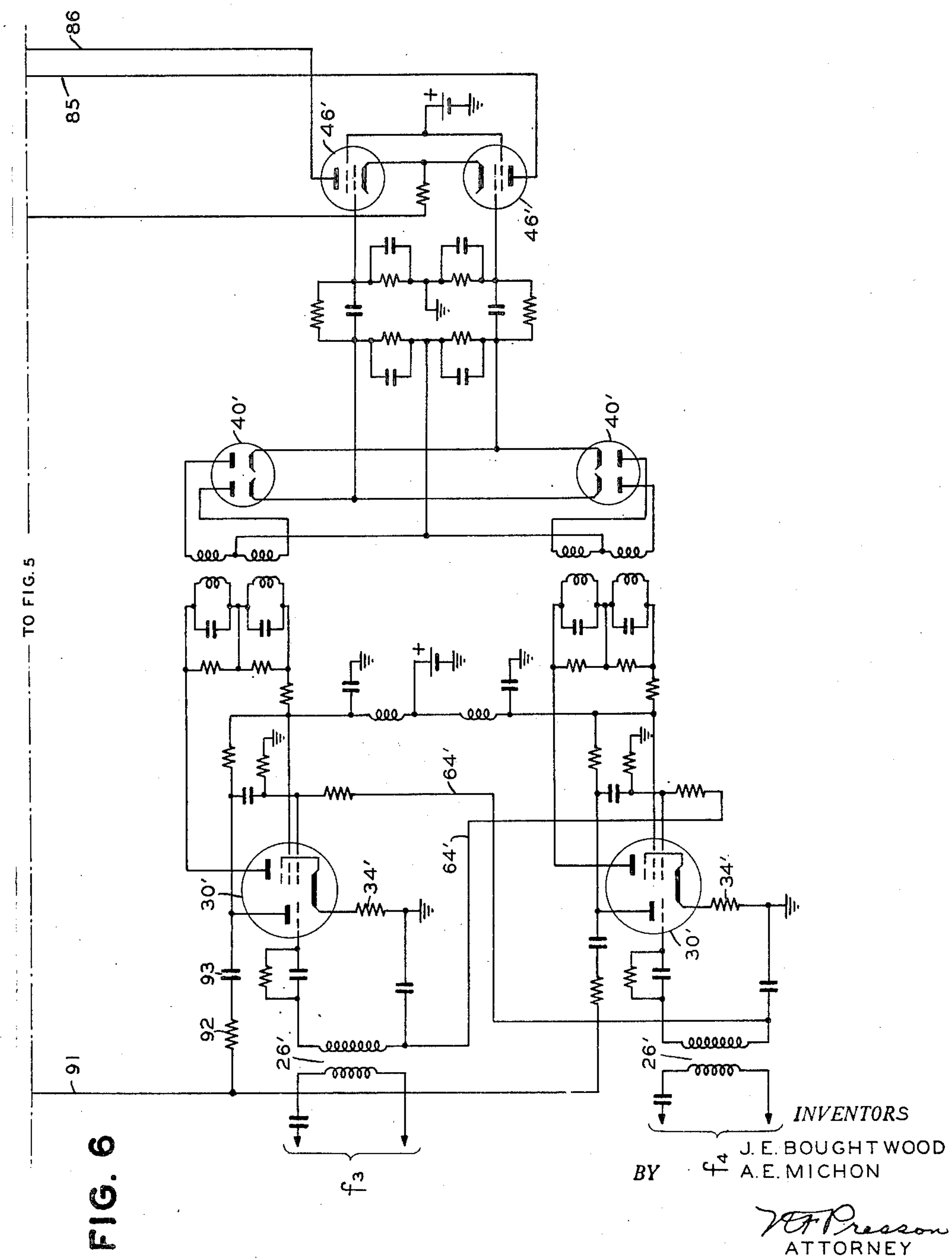

Figs. 5 and 6 illustrate how two pairs of subchannels may be combined to provide a frequency diversity channel employing four frequencies. Greatest reliability will be obtained when the frequencies are distributed over the widest available band width. Fig. 5 illustrates one pair of receivers and Fig. 6 shows the other pair of receivers in such a system. The two pairs of receivers are substantially identical with that shown in Fig. 3 except that a single receiving relay circuit is common to both pairs of receivers, and a control circuit, shown in the lower portion of Fig. 5, has been added whereby the pair of subchanels whose input level is highest furnishes the operating signal to the receiving relay to the exclusion of the other pair. The control circuit includes a pair of amplifier-rectifier stages, comprising vacuum tube amplifiers 88 and rectifiers 89, which receive their input potentials from a center-tapped grounded resistor 90 which connects symmetrically by means of a conductor 91 and isolating resistances 92 and condensers 93 to the plate of the first stage of each subchannel amplifier 30'. The output of the two rectifiers 89 enters a common circuit arranged to provide polar signals with respect to ground to each of a pair of Thyratron tubes 97. Thyratron tubes are respectively connected in series by a conductor 98 with the direct current amplifiers 46' for the two subchannel pairs so that the amplifiers may be alternately rendered inoperative through the deenergization of the appropriate Thyratron tubes. By virtue of a condenser 99 which joins the plates of the two Thyratron tubes, these tubes operate in inverter fashion so that when one tube strikes due to the application of a positive potential to its grid the plate current in the other tube is interrupted, and hence the two tubes may only be alternately conductive. In operation a potential will be developed across each half of the resistor 90 proportional to the levels of the combined subchannel frequencies of the respective pairs. The lower level subchannel pair will produce no effect upon the receiving relay 50' since the common cathode circuit of its direct current amplifier has been opened by the deenergized Thyratron. It will be apparent that within each subchannel pair the operation will continue as was explained in connection with Fig. 3.

Figure 7:
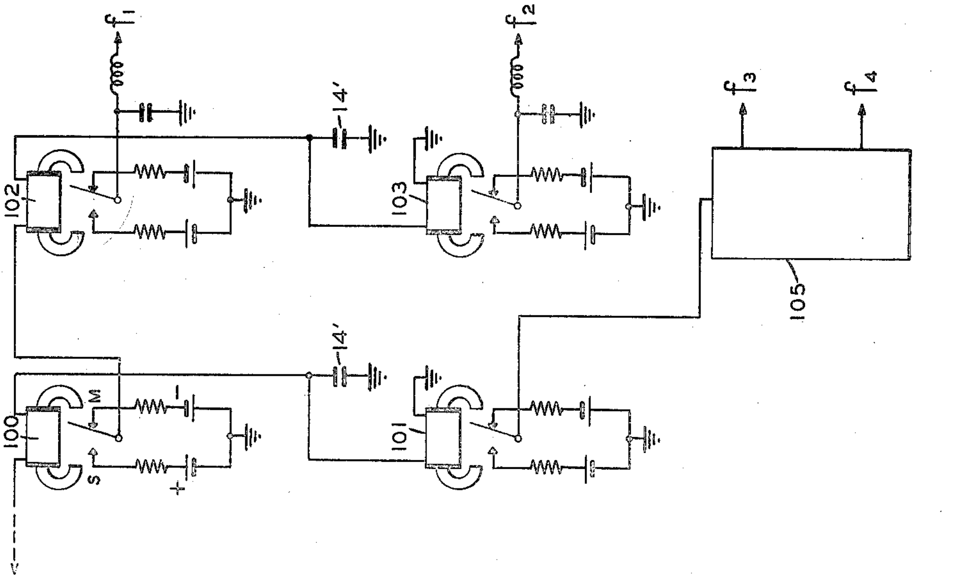
Fig. 7 shows a sending leg circuit for a four-subchannel transmitter.

At the transmitter, since it is not feasible to operate four transmitting relays in series in the sending leg circuit, an arrangement such as shown in Fig. 7 may be employed. In this figure, two relays 100 and 101 are operated directly in the transmitting leg circuit, and these relays each operate two subchannel transmitting relays in local circuits. Thus, relay 100 operates the subchannel transmitting relays 102 and 103, and relay 101 similarly operates two subchannel transmitting relays diagrammatically indicated at 105. For phasing purposes a condenser 14' is shown in shunt to one relay of each pair of local relays. If desired, the relays such as 101, 102 and 103 may have biasing windings as illustrated in Fig. 2.

The subchannel frequencies are not limited to any particular order but may be chosen in whatever combinations give the best results in practice on particular radio circuits. Dependent upon the combination selected, a reconnection of the transmitting relays may be necessary in order to facilitate the adjustment of the subchannels to give coincident signals at the receiving relays. The four subchannel circuit of Figs. 5, 6 and 7 is essentially a combination of two units of the types shown in Figs. 2 and 3. It is therefore readily possible, by means of simple switching or patching cord procedures, to combine circuits to provide greater reliability of operation when interference conditions become severe, while at other periods the capacity of the system may be increased by operating the subchannels in pairs only. In each of the receiving circuits illustrated in the drawings a two stage limiting amplifier is employed, but it is to be understood that such amplifiers may embody three or more stages thereby to increase the sensitivity of the circuits and enable them to discriminate between smaller differences in amplitude of the signals received over the respective subchannels.

Various modifications of the circuit arrangements and apparatus illustrated in the drawings, and various equivalents or substitutes in the devices shown, will readily occur to those versed in the art without departing from the spirit or scope of the present invention. The disclosure, therefore, is for the purpose of illustrating the principles of the invention which is not to be regarded as limited except as indicated by the scope of the appended claims.

We claim:

1. A frequency diversity telegraph signaling system comprising a transmitting device for producing marking and spacing signals representative of each character or other item of information to be transmitted, a first subchannel comprising means responsive to said signals for generating a marking frequency and a spacing frequency lying within a first frequency band, at least one other subchannel comprising means responsive to said signals for generating a marking frequency and a spacing frequency lying within another frequency band, means for selecting the first order side band while substantially suppressing higher order side bands and sending the marking and spacing frequencies respectively of the different bands simultaneously over said subchannels, said subchannels having substantially the same amplitude, a receiving circuit comprising a plurality of paths, means for selecting the different frequency bands of the subchannels respectively into said paths, means in each path for translating the signaling frequencies in that path into unidirectional signal currents, and means comprising a differential circuit responsive to said translated signal currents in said plurality of paths for producing marking and spacing signals corresponding to the signals produced by said transmitting device.

2. A frequency diversity telegraph signaling system comprising a transmitting device for producing marking and spacing signals representative of each character or other item of information to be transmitted, a first subchannel comprising means for generating a first channel frequency and responsive to said signals for varying the frequency to produce a marking frequency and a spacing frequency lying within a first frequency band, at least one other subchannel comprising means for generating another channel frequency and responsive to said signals for varying the frequency to produce a marking frequency and a spacing frequency lying within another frequency band, means for selecting the first order side band while substantially suppressing higher order side bands and sending the marking and spacing frequencies respectively of the different bands simultaneously over said subchannels, said subchannels having substantially the same amplitude, a receiving circuit comprising a plurality of paths, means for selecting the different frequency bands of the subchannels respectively into said paths, means in each path for translating the signaling frequencies in that path into unidirectional signal currents, and means comprising a differential circuit responsive to said translated signal currents in said plurality of paths for producing marking and spacing signals corresponding to the signals produced by said transmitting device.

3. A frequency diversity telegraph signaling system comprising a transmitting device for producing marking and spacing signals representative of each character or other item of information to be transmitted, a first subchannel comprising means responsive to said signals for generating a marking frequency and a spacing frequency lying within a first frequency band, at least one other subchannel comprising means responsive to said signals for generating a marking frequency and a spacing frequency lying within another frequency band, means including a filter individual to each band and common to the marking and spacing frequencies of that band for selecting the first order side band while substantially suppressing higher order side bands and sending the marking and spacing frequencies respectively of the different bands simultaneously over said subchannels, said subchannels having substantially the same amplitude, a receiving circuit comprising a plurality of paths, means for selecting the different frequency bands of the subchannels respectively into said paths, means in each path for translating the signaling frequencies in that path into unidirectional signal currents, and means comprising a differential circuit responsive to said translated signal currents in said plurality of paths for producing marking and spacing signals corresponding to the signals produced by said transmitting device.

4. A frequency diversity telegraph signaling system comprising a transmitting device for producing marking and spacing signals representative of each character or other item of information to be transmitted, a first subchannel comprising means responsive to said signals for generating a marking frequency and a spacing frequency lying within a first frequency band, at least one other subchannel comprising means responsive to said signals for generating a marking frequency and a spacing frequency lying within another frequency band, means including a filter individual to each band and common to the marking and spacing frequencies of that band for selecting the first order side band while substantially suppressing higher order side bands and sending the marking and spacing frequencies respectively of the different bands simultaneously over said subchannels, said subchannels having substantially the same amplitude, a receiving circuit comprising a plurality of paths, means including a filter individual to each subchannel and common to the marking and spacing frequencies of that subchannel for selecting the different frequency bands of the subchannels respectively into said paths, means in each path for translating the signaling frequencies in that path into unidirectional signal currents, and means comprising a differential circuit responsive to said translated signal currents in said plurality of paths for producing marking and spacing signals corresponding to the signals produced by said transmitting device.

5. A frequency diversity telegraph signaling system comprising a transmitting device for producing marking and spacing signals representative of each character or other item of information to be transmitted, a first subchannel comprising a sending oscillator having a natural frequency lying within a first frequency band, at least one other subchannel comprising a sending oscillator having a natural frequency lying within another frequency band, each of said oscillators having associated therewith at least two reactances having different frequency-varying characteristics, means controlled by said transmitting device for alternately connecting said reactances in circuit with each of the oscillators to produce marking and spacing signals by varying the oscillator frequency, means for selecting the first order side band while substantially suppressing higher order side bands and transmitting the frequency modulated signals from the oscillators simultaneously over said subchannels, said subchannels having substantially the same amplitude, a receiving circuit comprising a plurality of paths, means for selecting the frequency modulated signals of the different subchannels respectively into said paths, means in each path for translating the signaling frequencies in that path into unidirectional signal currents, and means comprising a differential circuit responsive to said translated signal currents in said plurality of paths for producing marking and spacing signals corresponding to the signals produced by said transmitting device.

6. A frequency diversity telegraph signaling system comprising a transmitting device for producing marking and spacing signals representative of each character or other item of information to be transmitted, a first subchannel comprising a sending oscillator having a natural frequency lying within a first frequency band, at least one other subchannel comprising a sending oscillator having a natural frequency lying within another frequency band, each of said oscillators having associated therewith at least two reactances having opposite frequency-varying characteristics, means controlled by said transmitting device for alternately connecting said reactances in circuit with each of the oscillators to produce marking and spacing signals by increasing or decreasing the oscillator frequency, means for selecting the first order side band while substantially suppressing higher order side bands and transmitting the frequency modulated signals from the oscillators simultaneously over said subchannels, said subchannels having substantially the same amplitude, a receiving circuit comprising a plurality of paths, means for selecting the frequency modulated signals of the different subchannels respectively into said paths, means in each path for translating the signaling frequencies in that path into unidirectional signal currents, and means comprising a differential circuit responsive to said translated signal currents in said plurality of paths for producing marking and spacing signals corresponding to the signals produced by said transmitting device.

7. A frequency diversity telegraph signaling system comprising a transmitting device for producing marking and spacing signals representative of each character or other item of information to be transmitted, a pair of subchannels one of which comprises means responsive to said signals for generating a marking frequency and a spacing frequency lying within a first frequency band and the other of which comprises means for generating a marking frequency and a spacing frequency lying within another frequency band, means including two filters respectively individual to the two bands and each common to the marking and spacing frequencies of its band for selecting the first order side band while substantially suppressing higher order side bands and sending the marking and spacing frequencies respectively of the different bands simultaneously over said pair of subchannels, said subchannels having substantially the same amplitude, a receiving circuit comprising two paths, means for selecting the different frequency bands of the two subchannels respectively into said two paths, means in each path for translating the signaling frequencies in that path into unidirectional signal currents, and means comprising a differential circuit responsive to said translated signal currents in both paths for producing marking and spacing signals corresponding to the signals produced by said transmitting device.

8. In a frequency diversity signaling system in which signals are transmitted over a first subchannel by means of marking and spacing frequencies positioned within a first frequency band and the same signals are simultaneously transmitted over at least one other subchannel by means of marking and spacing frequencies positioned within another frequency band, the combination of a plurality of thermionic regenerative limiting amplifiers which separately receive the signals transmitted over the different subchannels, each of said amplifiers having a first stage and a second stage, and means for preventing each amplifier from generating sustained oscillations due to fading of the signals on its channel which comprises cross-connections from the grid circuit of the first stage of each amplifier to the grid circuit of the second stage of each other amplifier, whereby negative biasing potential fed from a stronger subchannel reduces the sensitivity of the amplifier of a weaker subchannel sufficiently to prevent oscillation of the amplifier.

9. In a frequency diversity signaling system in which signals are transmitted over a first subchannel by means of marking and spacing frequencies positioned within a first frequency band and the same signals are simultaneously transmitted over at least one other subchannel by means of marking and spacing frequencies positioned within another frequency band, the combination of a plurality of thermionic regenerative limiting amplifiers which separately receive the signals transmitted over the different subchannels, each of said amplifiers having a first stage and a second stage, and means for preventing each amplifier from generating sustained oscillations due to fading of the signals on its channel which comprises cross-connections from the grid circuit of the first stage of each amplifier to the grid circuit of the second stage of each other amplifier, said cross-connections including rectifiers in the grid circuits of the second stages of the amplifiers and an impedance in circuit with said rectifiers, said rectifiers being poled so that negative potentials existing on any of the grids of the second stages of the amplifiers are impressed on said impedance, the cumulative potential across the impedance being applied to the grids of the first stages of the amplifiers in parallel, whereby negative biasing potential fed from a stronger subchannel reduces the sensitivity of the amplifier of a weaker subchannel sufficiently to prevent oscillation of the amplifier.

10. In a frequency diversity signaling system in which signals are transmitted over a first subchannel by means of marking and spacing frequencies positioned within a first frequency band and the same signals are simultaneously transmitted over at least one other subchannel by means of marking and spacing frequencies positioned within another frequency band, the combination of a plurality of thermionic regenerative limiting amplifiers which separately receive the signals transmitted over the different subchannels, each of said amplifiers having a first stage and a second stage, and means for preventing each amplifier from generating sustained oscillations due to fading of the signals on its channel which comprises cross-connections from the grid circuit of the first stage of each amplifier to the grid circuit of the second stage of each other amplifier, said cross-connections including rectifiers in the grid circuits of the second stages of the amplifiers, a resistance in circuit with said rectifiers, and a smoothing circuit, said rectifiers being poled so that negative potentials existing on any of the grids of the second stages of the amplifiers are impressed on said resistance, the cumulative potential across the resistance being applied through the smoothing circuit to the grids of the first stages of the amplifiers in parallel, whereby negative biasing potential fed from a stronger subchannel reduces the sensitivity of the amplifier of a weaker subchannel sufficiently to prevent oscillation of the amplifier.

11. In a frequency diversity signaling system in which signals are transmitted over a first subchannel by means of marking and spacing frequencies positioned within a first frequency band and the same signals are simultaneously transmitted over a second subchannel by means of marking and spacing frequencies positioned within a second frequency band, the combination of a plurality of thermionic regenerative limiting amplifiers which separately receive the signals transmitted over the different subchannels, each of said amplifiers having a plurality of successive stages, and means for preventing each amplifier from generating sustained oscillations due to fading of the signals on its channel which comprises cross-connections from the grid circuit of one of the stages of each amplifier to the grid circuit of a succeeding stage of each other amplifier, whereby negative biasing potential fed from a stronger subchannel reduces the sensitivity of the amplifier of a weaker subchannel sufficiently to prevent oscillation of the amplifier.

JOHN E. BOUGHTWOOD.
ALFRED E. MICHON.

REFERENCES CITED

The following references are of record in the file of this patent:

UNITED STATES PATENTS

| Number | Name | Date |
|---|---|---|
| 1,478,029 | De Forest | Dec. 18, 1923 |
| 1,875,165 | Schroter | Aug. 30, 1932 |
| 2,070,418 | Beverage | Feb. 9, 1937 |
| 2,154,921 | Vroom | Apr. 18, 1939 |
| 2,253,832 | Whitaker | Aug. 26, 1941 |
| 2,253,867 | Peterson | Aug. 26, 1941 |
| 2,282,526 | Moore | May 12, 1942 |
| 2,309,678 | Smith | Feb. 2, 1943 |
| 2,358,448 | Earp | Sept. 19, 1944 |
| 2,373,495 | Olsen | Apr. 10, 1945 |
| 2,384,456 | Davey | Sept. 11, 1945 |
| 2,386,844 | Davis | Oct. 16, 1945 |
| 2,420,868 | Crosley | May 20, 1947 |